July 12, 1932.    M. P. TELLER    1,867,195
HEAVY DUTY VALVE
Filed May 14, 1930
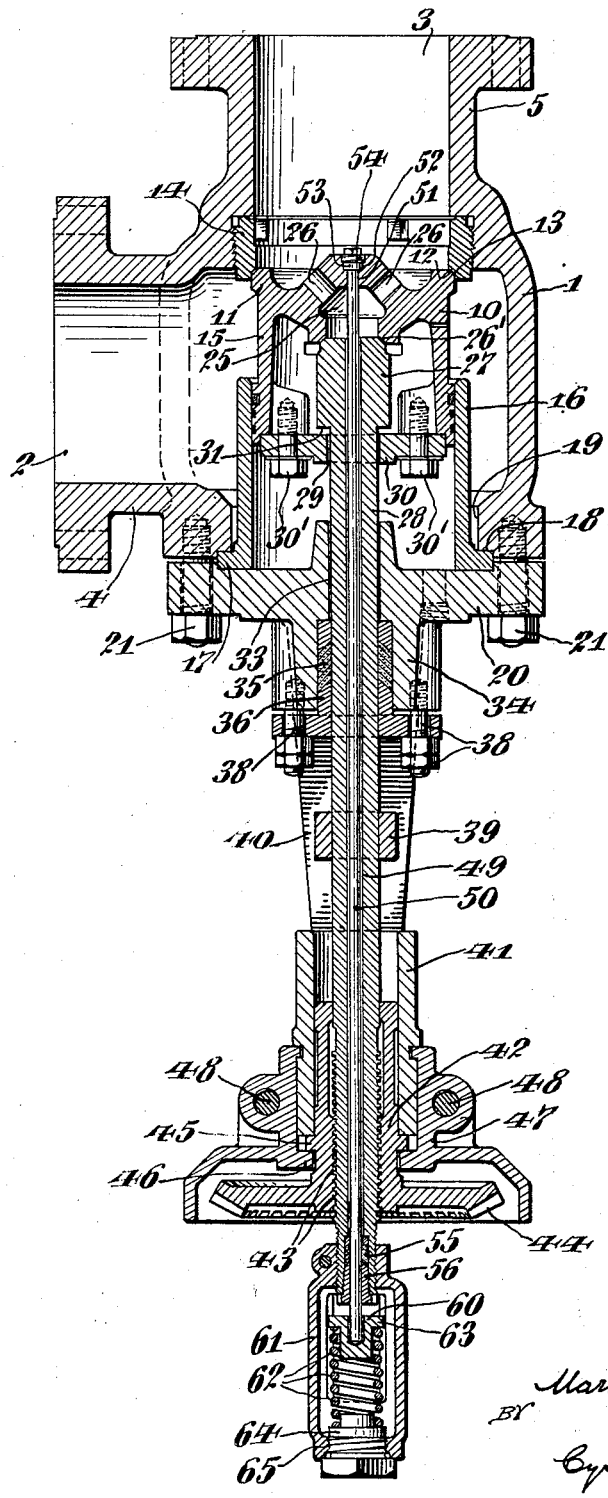
INVENTOR
Martin P. Teller
BY
Cyrus N. Anderson
Attorney Patented July 12, 1932

1,867,195

UNITED STATES PATENT OFFICE

MARTIN P. TELLER, OF PHILADELPHIA, PENNSYLVANIA, ASSIGNOR TO SCHUTTE AND KOERTING COMPANY, OF PHILADELPHIA, PENNSYLVANIA, A CORPORATION OF PENNSYLVANIA

HEAVY DUTY VALVE

Application filed May 14, 1930. Serial No. 452,173.

My invention relates to valves of the heavy duty type which are employed, among other things, for the purpose of controlling the passage of steam from a steam supply source to a steam turbine.

In the installation of valves of heavy duty type conditions are sometimes encountered which render it necessary to install the valve with the means for operating the movable member of the valve structure in depending relation to such structure. In such case the said movable valve member is moved upwardly to close and downwardly to open the same.

These valve structures usually are provided with pilot valves, the purpose of which is to facilitate the opening of the main valve. In the operation of such heavy duty valves the pilot valve is first opened so as to release the pressure of the steam or other fluid from the side thereof opposite the opening which is closed by the main valve. The opening movement of the pilot valve is in the same direction as that of the opening movement of the main valve, and in cases where the valve structure is supported in such position that the opening movement of the movable valve member is downward the main valve might, under the influence of gravity, follow the pilot valve in its downward movement and thus prevent satisfactory operation in the opening and closing of the said main valve.

The general object of the present invention is to provide means whereby upon a movement of the pilot valve in a direction to open the same the main valve is held against such movement to thereby facilitate the opening of the said main valve.

It also is an object of the invention to provide means for preventing chattering of the main valve when the latter has been moved into a very nearly closed position.

Without attempting to set forth at this time all of the objects and advantages incident to my invention I shall proceed with a detailed description thereof wherein additional objects and advantages will be pointed out or else will become apparent.

In order that the invention may be readily understood and its practical features of construction and operation more fully appreciated, reference should be had to the accompanying drawing wherein I have shown a longitudinal section of a valve structure of heavy duty type including means for opening and closing the movable member of such structure.

In the drawing I have shown at 1 a valve casing which is stationary and into which steam or other fluid under pressure may enter through an opening 2 and from which such steam or other fluid may escape through an opening 3. The flanged outer ends of the projections 4 and 5, within which the passageways 2 and 3 are provided, are connected with pipes, not shown, by which the steam or other fluid is conducted from a source of supply to a steam turbine or other motor to be actuated thereby.

The passage of the steam or other fluid under pressure through the valve casing 1 is controlled by means of a movable valve member 10 having what may be described as a head portion 11, the outer edge or corner 12 of which is beveled, as indicated, and thereby adapted to seat against a correspondingly beveled portion 13 upon the inner edge of a cylindrical bushing 14 having screw-threaded engagement with the inner end of the outlet passageway 3. The movable valve member 10 comprises a cylindrical skirt portion 15 which projects into a cylindrical support and guide member 16 which is provided upon its outer end with an outwardly extending flange 17 which is clamped between a shoulder 18 upon the member 1 at the lower outer edge of an opening 19 and a disc member 20. The latter is fastened to the body or casing 1 to close the opening 19 by means of screw bolts 21. The opening at 19 is in opposed relation to the outlet opening 3.

The head portion 11 of the movable valve member 10 is provided upon its inner side with a recess 25 which is in communication through openings 26 with the outlet passageway or port 3. The lower inner edge of the opening into the recess 25 is beveled or inclined outwardly, as indicated at 26', to form a seat for a correspondingly beveled portion upon the upper outer edge of a pilot valve 27. The said pilot valve is adapted to open and close the opening into the recess 25. The pilot valve 27 is provided with a stem 28 which passes through an opening 29 provided in the cap plate 30 which closes the lower or inner end of the skirt 15 of the movable valve member 10. The cap plate 30 is fastened to the lower or inner end of the skirt 15 by means of screw bolts 30'.

It may be noted that the skirt portion 15 of the movable valve member is provided, as usual, with openings through which steam or other fluid under pressure may pass.

The stem 28 is of less diameter than the pilot valve 27 so that a shoulder is provided at 31 upon the lower end of the valve 27 which is adapted to abut or contact with the inner side of the cap or closing plate 30. When the pilot valve is in closed position, as shown in the drawing, the shoulder 31 is spaced a short distance from the cap or closing plate 30 so that the said pilot valve may move a short distance between the said plate and the seat 26'.

The stem 28 extends outward through an opening 33 provided centrally of the closing disc 20. For the purpose of tightly closing the joint between the stem 28 and the disc 20 I have provided upon the lower or outer side of the latter a tubular projection 34 within which packing 35 is provided which is adapted to be compressed by means of a gland 36 which is adapted to be forced into the annular space between the stem 28 and the tubular portion 34 by means of screw bolts 38, in the manner shown. The stem 28 extends a considerable distance beyond the lower or outer end of the tubular projection 34 and is guided by means of a supplemental guide 39 which is supported between bars 40, only one of which is shown, which extend downwardly or outwardly from the disc 20. The lower ends of the bars 40 terminate in a cylindrical portion 41 provided with an internally screw-threaded sleeve 42 which is in engagement with external screw threads 43 upon the lower end portion of the stem 28.

The sleeve 42 is provided with a gear 44 upon its lower or outer end which is adapted to be engaged by a gear pinion (not shown) for the purpose of rotating the same together with the said sleeve. The sleeve is held against longitudinal movement by means of a flange 45 which is held between the lower end of the cylindrical portion 41 and a flange 46 provided centrally of the two-part member 47, the two parts of which are adapted to be detachably held together by means of bolts 48.

The pilot valve 27 and its stem 28 are provided with an opening 49 extending lengthwise and from end to end thereof within which is located a rod 50. The upper end of the said rod extends through an opening 51 provided centrally of the head 11 of the valve member 10. The rod 50 fits closely in the opening 51. The said opening terminates in an enlargement 52 within which is seated the enlargement or head 53 upon the upper or inner end of the rod 50. For retaining the head 53 in place and for fastening the rod 50 to the head 11 of the valve member 10 I have provided a screw-threaded plug 54 which has screw-threaded engagement with the enlarged outer or upper end of the opening 52. When the plug 54 is screwed into position it will be apparent that the rod 50 is secured or fastened to the valve member 10. The lower or outer end of the opening 49 is enlarged for the reception of packing material 55 which is compacted and held in position by an adjustable gland 56.

The lower or outer end of the rod 50 extends through and beyond the gland 56 and projects into a cup-like member 60 located in a supporting casing 61, being supported therein by means of a coiled spring 62, the upper end of which is seated against the lower side of a lateral flange 63 at the upper end of the said cup-like member, while the opposite or lower end of the said spring is seated against a plug 64 mounted in a screw-threaded opening 65 in the lower end of the casing 61. Any suitable means, such as a lever and weight, may be substituted for the spring 62.

The spring 62 normally is under compression. Its tendency to expand exerts a force upon the rod 50 which is transmitted to the valve 10 and tends to cause movement of the latter into closed position. The force exerted by the spring 62, acting through the rod 50, counterbalances the force of gravity acting upon the valve member 10. It follows that when the internally screw-threaded sleeve 42 is rotated in a direction to cause downward or outward movement of the pilot valve stem 28, together with the said pilot valve, to open the same, the spring 62 operates to resist and to prevent a corresponding movement of the main valve 10. In consequence of this the pilot valve begins to open with the initial rotary movement of the internally screw-threaded member 42 in a direction to effect the end desired. The main valve will remain in closed position until the shoulder 31 of the pilot valve engages the cap plate 30, whereupon the continued operation by rotation of the sleeve 42 will effect complete opening of the valve member 10.

When it is desired to adjust the valve member 10 from open to closed position the sleeve member 42 is rotated in the opposite direction to cause movement of the pilot valve 27 first into closed position after which both the pilot and main valves are moved forward together to effect closing of the latter. The action of the spring through the rod 49 upon the main valve 10 prevents vibration or chattering of the latter when it is in a very nearly closed position.

Having thus described my invention what I claim and desire to secure by Letters Patent is:

1. In a valve structure, the combination of a casing having a valve seat interiorly thereof, a movable valve member located within said casing and cooperating with said seat to open and close the passageway through said valve casing, said valve member having a passageway therethrough, a pilot valve for opening and closing the said passageway, said pilot valve having a stem which projects from the said casing and also having an opening extending through the said valve and stem axially thereof, a rod extending through said opening and having connection at one end with the said valve member, and means acting upon the opposite end of said rod which tends to hold the said valve member in closed position.

2. In a valve structure, the combination of a casing having a seat interiorly thereof, a movable valve member which cooperates with said seat to open and close the passageway through said casing, said movable valve member having a passageway therethrough, a pilot valve for opening and closing the said passageway, said pilot valve having a stem which projects from the said casing, the said pilot valve and stem having an opening extending therethrough axially thereof, means in engagement with the said stem for causing opening and closing movements of the said pilot valve, a rod extending through the opening in said pilot valve and stem, one end of said rod having connection with the said movable valve, and yielding means supported upon the outer end of the said valve stem which is normally under compression, the said yielding means acting upon the opposite end of said rod and holding the said movable valve against movement during the initial opening movement of the said pilot valve.

3. In a valve structure, the combination of a casing provided with a passageway therethrough and also having a seat interiorly thereof, a movable valve member for cooperating with said seat to open and close the said passageway, said movable valve member having an opening therethrough, a pilot valve for opening and closing said opening, said pilot valve having a stem which projects from said casing, said pilot valve and stem having an opening extending therethrough and axially thereof, means in engagement with the said stem for opening and closing the pilot valve and for opening and closing the said valve member, a rod extending through the opening of said pilot valve and stem and having connection at one end with the said valve member, a support mounted upon the outer end of said pilot valve stem, and a coiled spring mounted in said support, said spring being normally under compression and acting upon said rod to hold the same in its uppermost position and prevent opening movement of the said valve member upon the initial opening movement of the said pilot valve.

4. In a valve structure, the combination of a valve casing having a seat and fluid outlet and inlet passages therein, a valve member cooperating with said seat having a passage therein connecting said fluid outlet and inlet passages, a pilot valve for opening and closing said passageway through said valve member and having lost motion connection therewith, means interposed between said valve member and pilot valve for stressing said valve member against said seat during movement of said pilot valve through said lost motion connection, and means for actuating said pilot valve and for actuating said valve member through said pilot valve independently of said last mentioned means.

5. In a valve structure, the combination of a valve casing showing a seat and fluid outlet and inlet passages therein, a valve member mounted beneath and cooperating with said seat having a passage therein connecting said fluid outlet and inlet passages, a pilot valve for opening and closing said passageway through said valve member and having lost motion connection therewith, means interposed between said valve member and pilot valve for supporting the weight of and stressing said valve member against said seat during movement of said pilot valve through said lost motion connection, and means for actuating said pilot valve and for actuating said valve member through said pilot valve independently of said last mentioned means.

In testimony that I claim the foregoing as my invention I have hereunto signed my name this 13th day of May, A. D., 1930.

MARTIN P. TELLER.